(12) United States Patent
Bergman et al.

(10) Patent No.: US 11,786,962 B2
(45) Date of Patent: Oct. 17, 2023

(54) REPAIR OF CORE POSITIONING FEATURES IN CAST COMPONENTS

(71) Applicant: Raytheon Technologies Corporation, Farmington, CT (US)

(72) Inventors: Russell J. Bergman, South Windsor, CT (US); Carl Busta, Glastonbury, CT (US); Lea Dynnette Castle, Vernon, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/369,719

(22) Filed: Jul. 7, 2021

(65) Prior Publication Data

US 2021/0331232 A1   Oct. 28, 2021

Related U.S. Application Data

(63) Continuation of application No. 16/786,291, filed on Feb. 10, 2020.

(51) Int. Cl.
*B22C 9/06* (2006.01)
*B22C 9/10* (2006.01)
*B22C 21/14* (2006.01)

(52) U.S. Cl.
CPC .............. *B22C 9/064* (2013.01); *B22C 9/061* (2013.01); *B22C 9/101* (2013.01); *B22C 21/14* (2013.01)

(58) Field of Classification Search
CPC ......... B22C 9/064; B22C 9/061; B22C 9/101; B22C 9/18; B22C 9/22; B22C 9/24; B22C 9/26; B22C 21/14
See application file for complete search history.

(56) References Cited

U.S. PATENT DOCUMENTS

| | | | |
|---|---|---|---|
| 5,099,576 A * | 3/1992 | Shinmura | F28F 1/025 165/173 |
| 5,465,780 A | 11/1995 | Munter et al. | |
| 6,413,650 B1 | 7/2002 | Dupree et al. | |
| 6,454,156 B1 | 9/2002 | Taras, Jr. et al. | |
| 6,615,470 B2 | 9/2003 | Corderman et al. | |
| 10,022,790 B2 | 7/2018 | Lee et al. | |
| 2004/0094287 A1 | 5/2004 | Wang | |
| 2017/0175540 A1 | 6/2017 | Weber et al. | |

OTHER PUBLICATIONS

European Search Report Application No. EP21156412; dated Jun. 14, 2021; pp. 14.

* cited by examiner

*Primary Examiner* — Kevin P Kerns
*Assistant Examiner* — Steven S Ha
(74) *Attorney, Agent, or Firm* — CANTOR COLBURN LLP

(57) ABSTRACT

An investment casting process for manufacturing a cast component is provided. The investment casting process includes forming a core, casting the cast component about the core such that a core positioning feature provides a location of an anticipated pilot hole in the cast component, removing the core from the cast component once the casting is completed, locating, forming and sizing a pilot hole to form a resized pilot hole that can receive a sealing plug and installing the sealing plug into the resized pilot hole.

8 Claims, 7 Drawing Sheets

REPAIR OF CORE POSITIONING FEATURES IN CAST COMPONENTS

CROSS-REFERENCE TO RELATED APPLICATION

This application is a continuation of U.S. application Ser. No. 16/786,291, filed on Feb. 10, 2020, the disclosure of which is incorporated herein by reference in its entirety.

BACKGROUND

The following description relates to investment casting processes and, more particularly, to investment casting processes in which a core positioning feature is replaced with a sealing plug.

In the investment casting process, core positioning features are often used to position a core within a mold and to maintain wall thicknesses. Some of these core positioning features may result in residual holes in the cast component that fluidly connect an internal cavity with an external cavity resulting in leakages across a cast wall. For example, prior to wax injection, bumpers may be attached to or formed integrally with the core. This can result in small kiss-out holes. Other core positioning features may be inserted following wax injection. Platinum pins may be inserted through the wax to contact the core, but melt away during metal pouring. Quartz rods may also be inserted through the wax to contact the core, but do not melt away during metal pouring. The use of quartz rods can result in longer core leaching cycles and small print-out holes.

BRIEF DESCRIPTION

According to an aspect of the disclosure, an investment casting process for manufacturing a cast component is provided. The investment casting process includes forming a core, casting the cast component about the core such that a core positioning feature provides a location of an anticipated pilot hole in the cast component, removing the core from the cast component once the casting is completed, locating, forming and sizing a pilot hole to form a resized pilot hole that can receive a sealing plug and installing the sealing plug into the resized pilot hole.

In accordance with additional or alternative embodiments, the core positioning feature is a bumper integral with the core.

In accordance with additional or alternative embodiments, the method further includes creating a wax pattern of the cast component surrounding the core, wherein additional wax material is added at a location of the bumper when creating the wax pattern.

In accordance with additional or alternative embodiments, the core positioning feature includes a pin.

In accordance with additional or alternative embodiments, the sizing of the pilot hole removes surface contaminants within the pilot hole to create a suitable surface for receiving the sealing plug.

In accordance with additional or alternative embodiments, the method further includes machining the cast component after installing the sealing plug.

In accordance with additional or alternative embodiments, the installing of the sealing plug includes brazing the sealing plug to the cast component.

In accordance with additional or alternative embodiments, the sealing plug forms at least a portion of an internal feature.

In accordance with additional or alternative embodiments, the sealing plug connects at least two opposing walls of an internal cavity.

According to an aspect of the disclosure, an investment casting process for manufacturing a cast component is provided. The investment casting process includes forming a core including a main portion and bumpers integral with and extending outwardly from the main portion at a location to install a sealing plug relative to the cast component, casting the cast component about the core such that the bumpers provide locations of pilot holes, leaching the core from the cast component once the casting is completed such that an internal cavity is formed within the cast component, locating, forming and sizing at least one of the pilot holes to form at least one resized pilot hole receptive of the sealing plug and installing the sealing plug into the at least one resized pilot hole.

In accordance with additional or alternative embodiments, the casting includes adding positive material around the bumpers.

In accordance with additional or alternative embodiments, the method further includes machining the cast component after installing the sealing plug.

In accordance with additional or alternative embodiments, the installing of the sealing plug into the at least one resized pilot hole includes brazing the sealing plug to the cast component.

In accordance with additional or alternative embodiments, the installing of the sealing plug forms at least a portion of an internal feature which is extendible across an internal cavity within the cast component.

According to an aspect of the disclosure, a cast component is provided and includes an internal cavity formed from a core material, the core material having a core positioning feature extending from a surface of the core material, wherein upon casting a pilot hole is formed at a location of the core positioning feature on a surface of the cast component, and wherein the pilot hole is expanded to form a resized pilot hole for receiving a sealing plug.

In accordance with additional or alternative embodiments, the cast component further includes a sealing plug received and brazed in the resized pilot hole.

In accordance with additional or alternative embodiments, the cast component is a heat exchanger component, the internal cavity defines open space between portions of the heat exchanger component and the sealing plug extends across the internal cavity between the portions of the heat exchanger component.

In accordance with additional or alternative embodiments, the cast component is a turbine airfoil component, the internal cavity defines open space between portions of the turbine airfoil component and the sealing plug extends across the internal cavity between the portions of the turbine airfoil component.

In accordance with additional or alternative embodiments, the core material and the core positioning features are ceramic.

In accordance with additional or alternative embodiments, the core positioning feature has a frustoconical shape.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

These and other advantages and features will become more apparent from the following description taken in conjunction with the drawings.

DETAILED DESCRIPTION

In some investment casting applications, wall thickness needs to be controlled to a high degree and the leakage resulting from the residual holes of wall positioning features is not tolerated. In these or other applications, conventional core positioning features typically cannot be used. Thus, as will be described below, an investment casting process is provided in which at least one core positioning feature is positioned on a surface of a core to position the core during the investment casting process. The core positioning features, preferably bumpers or pins, allow for controlled wall thicknesses and location for a resultant sealing plug. Post-casting, but prior to finishing, the core positioning features can form a residual hole in a wall of the cast component, which acts as a pilot hole. This residual hole is a kiss-out resulting from the contact of the core positioning feature to the ceramic mold. In the case of a pin-shaped core positioning feature, such as a quartz rod, this residual hole is a print-out resulting from the pin extending from the surface of the core into the ceramic mold. The residual holes are irregular in shape so that plugging the residual hole is dependent on the ability to uniformly fill the residual hole with a compatible material. Additionally, the as-produced residual holes include contaminants that must be removed to enable an acceptable braze joint. By resizing the pilot hole located at the residual hole, these small holes can be fixed with the installation of a sealing plug comprising a material compatible to the base alloy of the cast material. In some instances, if the sealing plug bridges the opposing walls of an internal cavity of the cast component, it can be used to complete or create an internal feature such as a rib.

Figure 1:
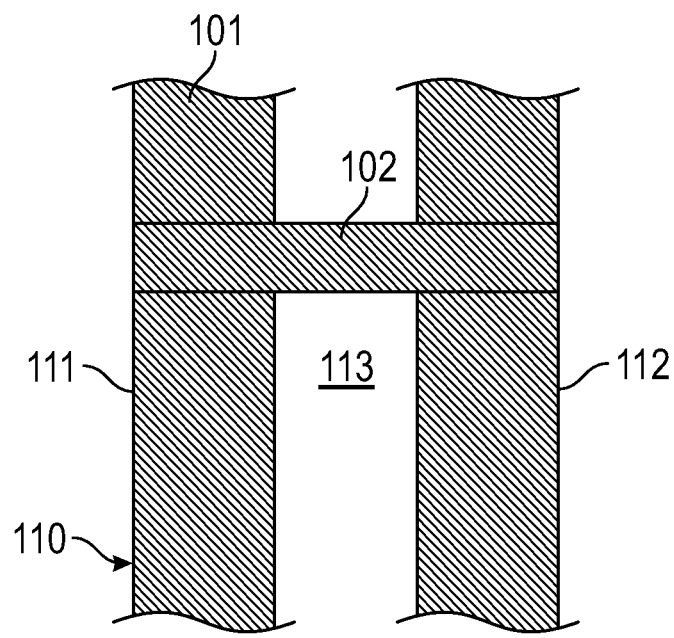
FIG. 1 is a side view of a cast component in accordance with embodiments.
Figure 2:
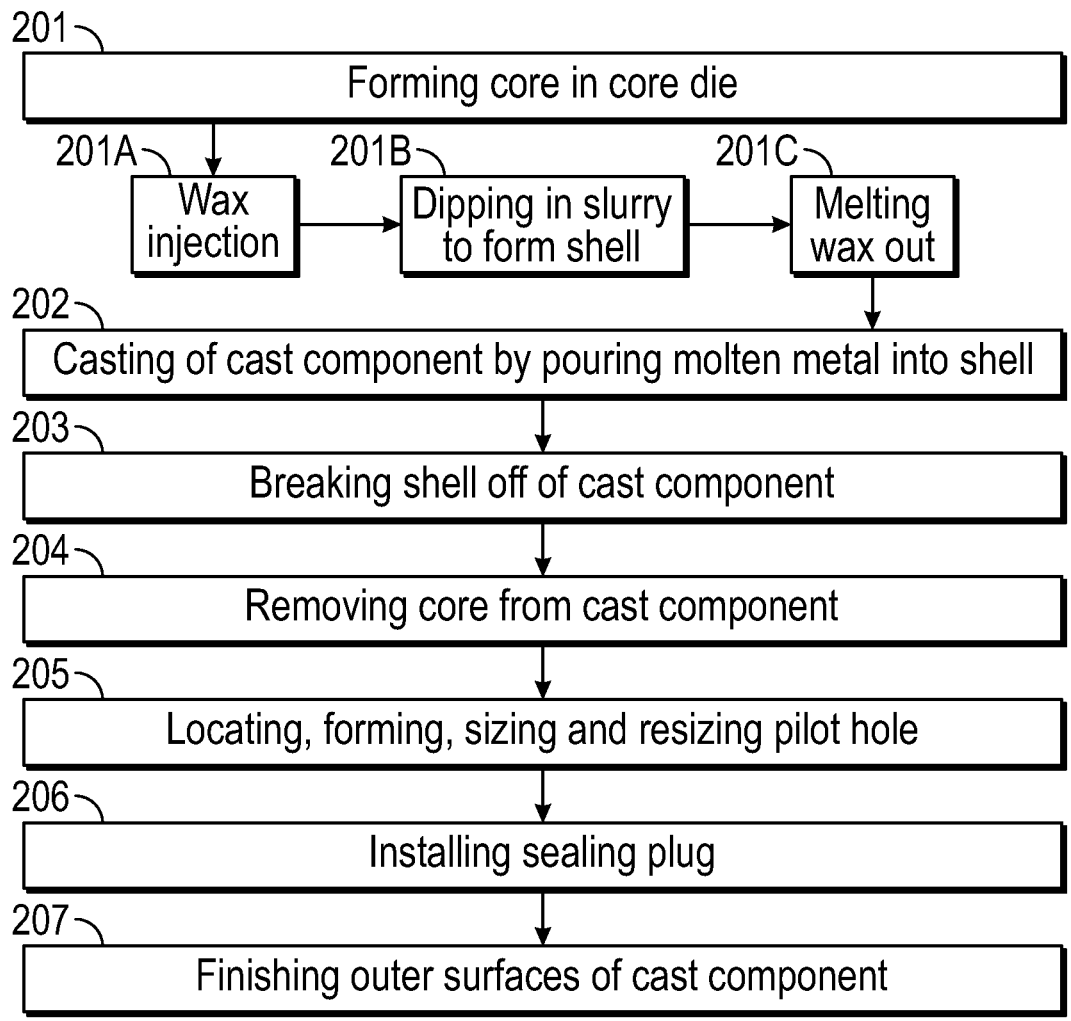
FIG. 2 is a flow diagram illustrating a method of casting and manufacturing a cast component in accordance with embodiments.
Figure 3:
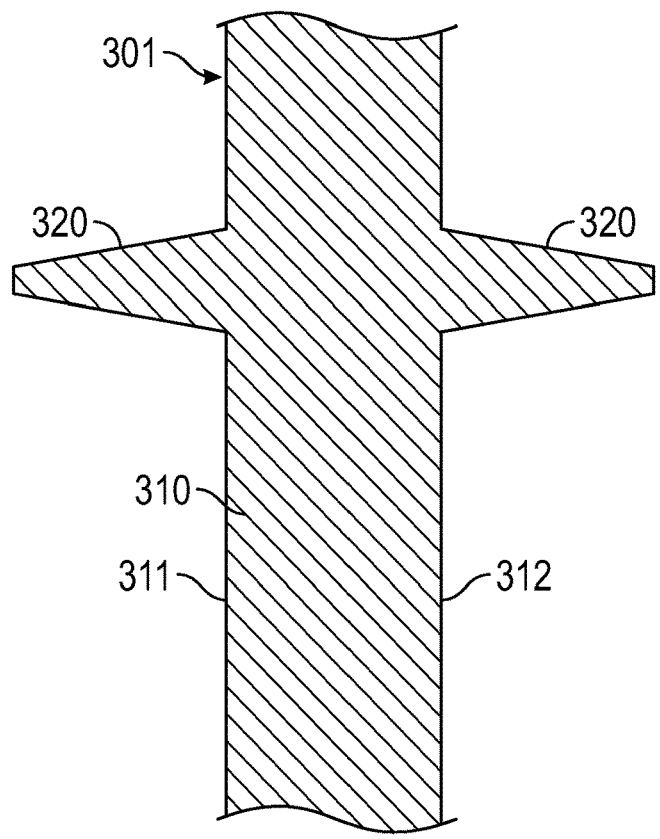
FIG. 3 is a side view of a core used to cast a cast component in accordance with embodiments.

With reference to FIGS. 1-3, an investment casting process is provided for manufacturing a cast component 101 that includes a sealing plug 102 (see FIG. 1). The cast component 101 can be provided as a heat exchanger component 110 or a turbine airfoil component. The sealing plug 102 can be used to form at least a portion of an internal feature such as a rib 120. It is to be understood that various types of components (e.g., heat exchanger components, turbine airfoil components, etc.) can be cast using the investment casting process described herein. It is also to be understood that the sealing plug 102 may be an isolated feature, a portion of an internal feature, the entirety of an internal feature such as an internal rib, a turbulator, a pedestal, etc.

Figure 10:
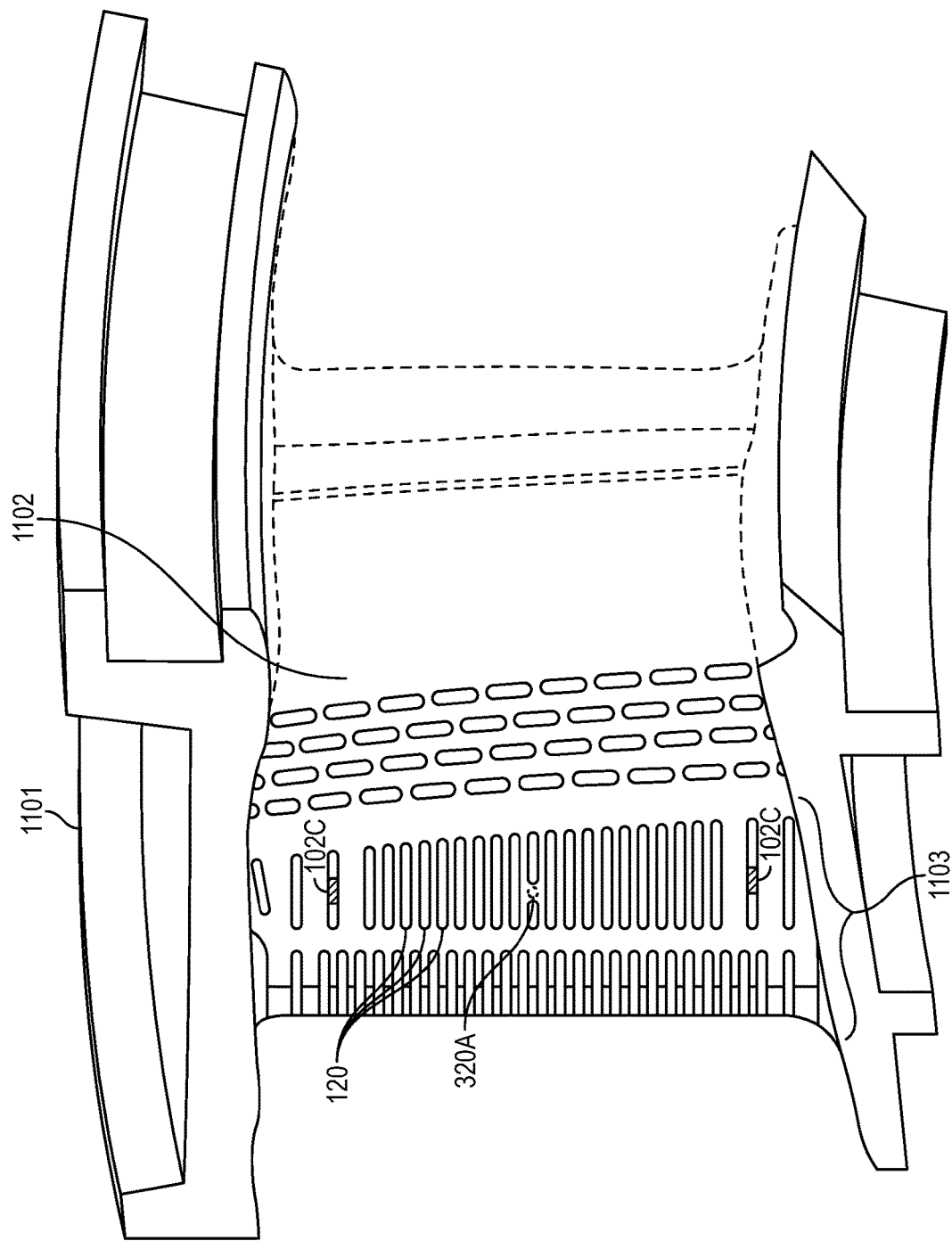
FIG. 10 is a perspective view of a turbine airfoil component in accordance with embodiments.

It is to be further understood that the following description will generally relate to the case of the cast component 101 being provided as the heat exchanger component 110 and the sealing plug 102 partially forming an internal feature 120 such as a rib of a heat exchanger component 110 and to a turbine airfoil component 1101 and the sealing plug 102C (see FIG. 10). This is done for purposes of clarity and brevity and should not otherwise limit the scope of the application as a whole in any way.

As shown in FIG. 1, the cast component 101 includes at least a first surface 111 and a second surface 112. The first and second surfaces 111 and 112 are disposed at a distance whereby an internal cavity 113 is defined between an interior surface opposite the first surface 111 and an interior surface opposite the second surface 112. The sealing plug 102, in this embodiment, extends across the internal cavity 113 between the interior surfaces opposite the first surface 111 and the second surface 112. In another embodiment, the sealing plug 102 does not extend substantially across the internal cavity 113, but may only extend into a portion thereof.

Figure 1A:
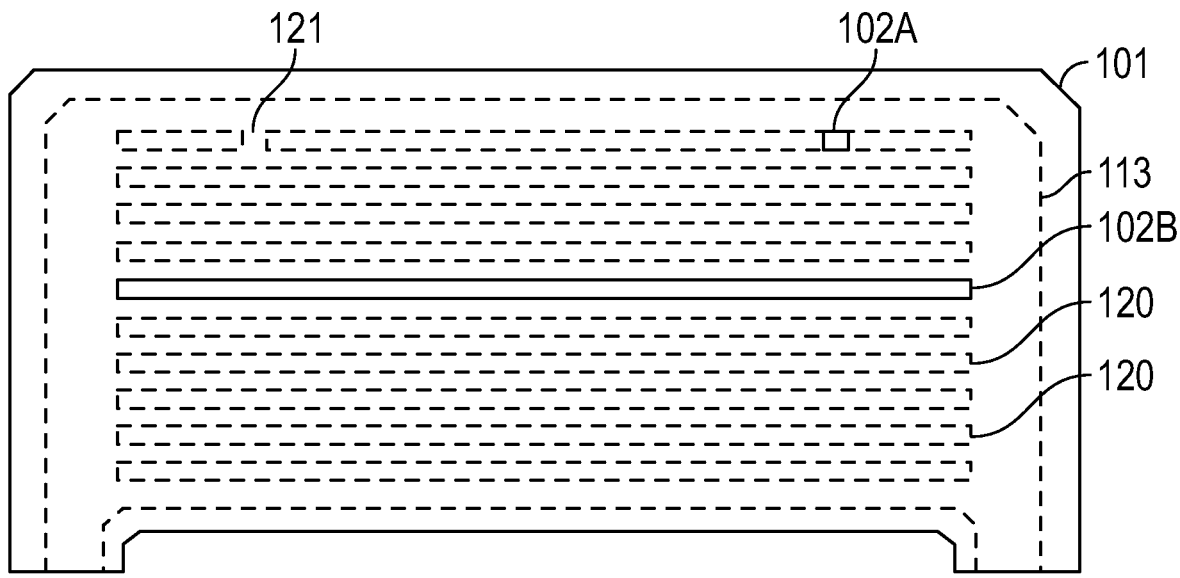
FIG. 1A is a schematic view of a cast component in accordance with embodiments.

As shown in FIG. 1A, the cast component 101 includes an internal cavity 113 with internal features such as ribs 120 that connect the interior surfaces opposite the first surface 111 and the second surface 112. These internal features may include interruptions 121 to locally facilitate core positioning features such as bumpers 320 (see FIG. 3) or pins 901 (see FIG. 8). The sealing plug 102A may complete a portion of the internal feature 120. If the size of the internal feature 120 is sufficiently small (not shown) or if the internal feature 120 is replacing a significant number of bumpers 320, the sealing plug 102B may form the entire internal feature 120.

As shown in FIGS. 2 and 3, the investment casting process initially includes operation 201 in which a core 301 is formed in a core die 302 (see FIG. 4) such that the core 301 includes a main portion 310 and at least one core positioning feature on a surface thereof, i.e., a bumper 320. The core 301 can be formed of ceramic or another suitable material such as a refractory metal. The main portion 310 is sized and configured to eventually form the internal cavity 113 of the cast component 101. The core bumpers 320 are integrally connected to the main portion 310 and are disposed to extend outwardly from surfaces 311 and/or 312 of the main portion 310 at the anticipated location of the sealing plug 102 relative to the cast component 101. That is, the core bumpers 320 are disposed at a location that corresponds to the eventual location of the sealing plug 102 once the cast component 101 is cast and finished.

Figure 4:
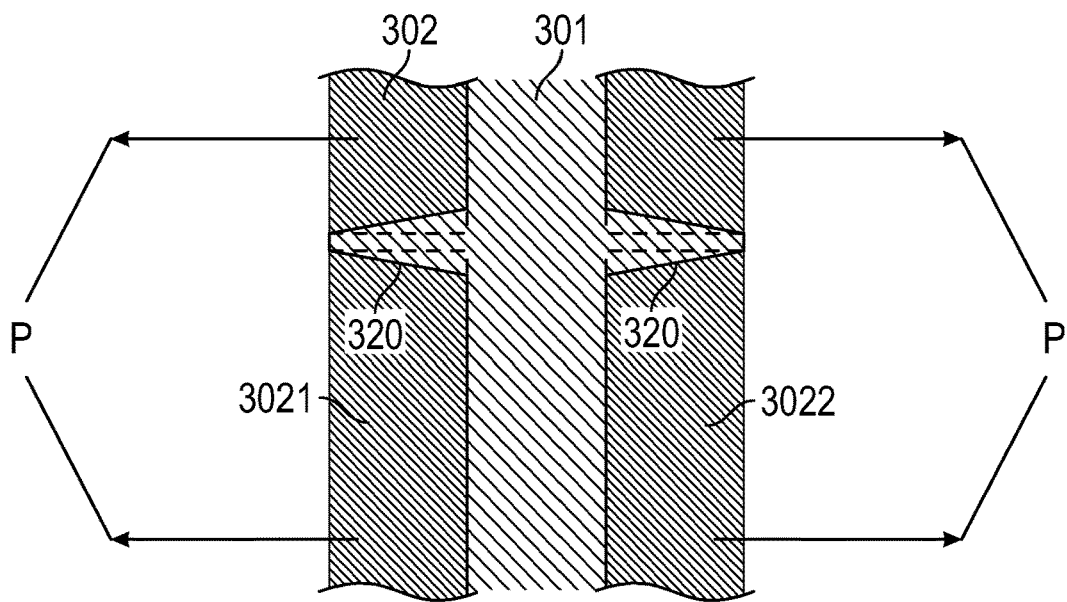
FIG. 4 is a side view illustrating a removal of a core from a core die in accordance with embodiments.

With reference to FIG. 4, the core 301 is removed from the core die 302. As shown in FIG. 4, the removing of the core 301 from the core die 302 can include pulling first and second core die parts 3021 and 3022 away from the core 301 along a single pull-direction P. To facilitate this pulling, each of the core bumpers 320 has a shape that prevents interference along the single pull-direction P. In accordance with embodiments, this shape can be frustoconical although it is to be understood that other shapes (linear and non-linear) are possible. In accordance with embodiments, the frustoconical angle of the core bumpers 320 can be varied between shallowness and steepness as illustrated in FIG. 4 by the dotted lines within the core bumpers 320.

In other embodiments, the core positioning features do not need to have a shape that prevents interference along a common pull-direction. If the core positioning features are of a shape requiring a non-linear pull plane, i.e., a circle, a flexible core die such as that described in U.S. Pat. No. 7,410,606, incorporated herein by reference, may be advantageous.

The following description will generally relate to the case of the core bumpers 320 having the frustoconical shape. This is done for clarity and brevity and should not be interpreted as limiting the scope of the application as a while in any way.

With reference back to FIG. 2, once the core 301 is formed and then removed from the core die 302, the core 301 is placed in a wax pattern die and wax is injected around the core 301 in operation 201A so that the wax is formed into a shape of a final metal part (i.e., the cast component 101). The wax is then repeatedly dipped in a ceramic slurry forming a shell 601 (see FIG. 5) in operation 201B such that the inside of the shell 601 is the external shape of the final metal part as defined by the wax shape. After the shell 601 cures and hardens, the wax is melted out in operation 201C and the core 301 remains trapped inside the shell 601.

Figure 6:
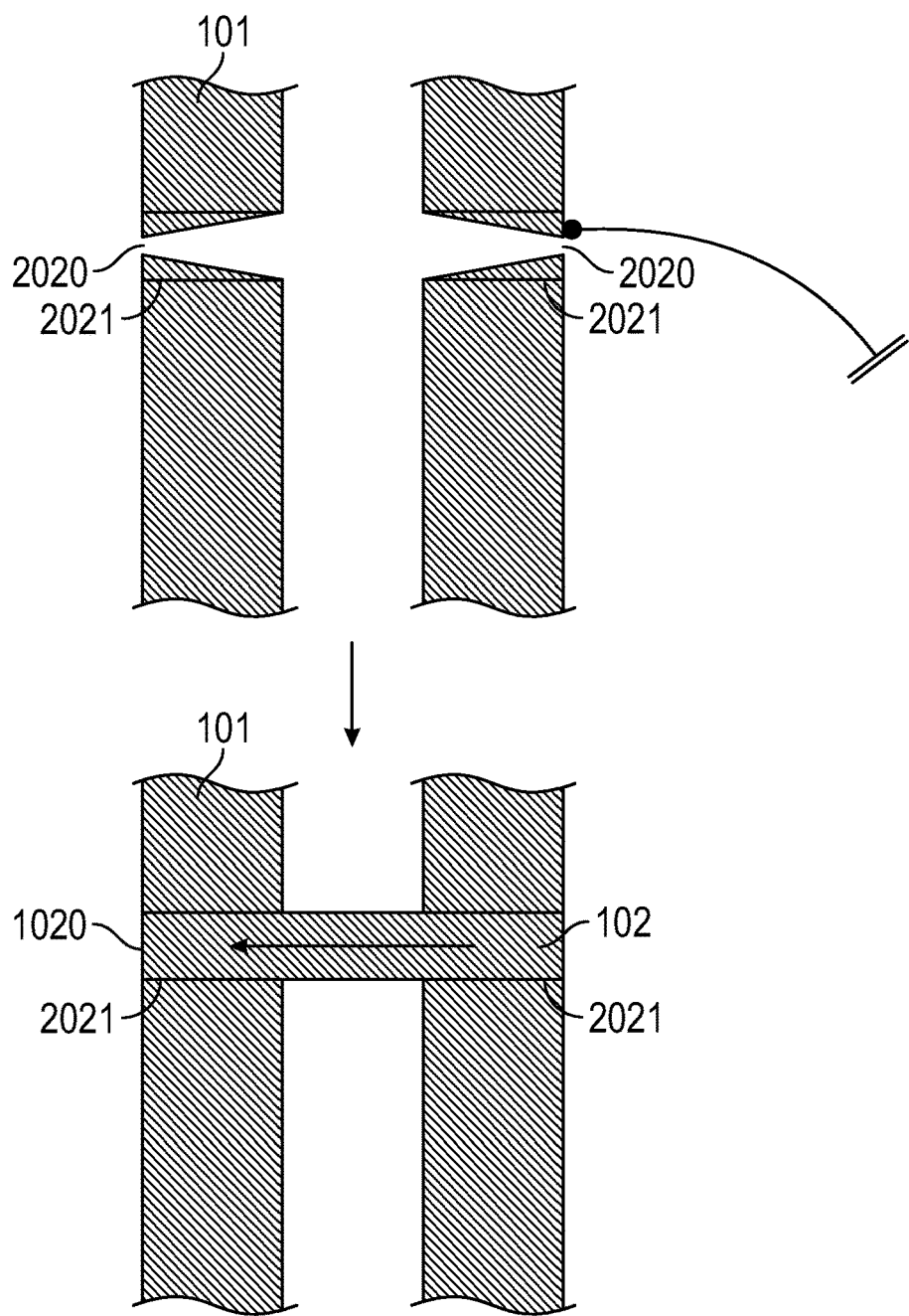
FIG. 6 is a side view illustrating a location and formation of pilot holes, a resizing of the pilot holes to form resized pilot holes and an installation of a sealing plug into a cast component in accordance with embodiments.

As further shown in FIG. 2, the investment casting process also includes operation 202 of casting the cast component 101 by pouring molten metal into the shell 601 wherein the molten metal replaces the space created by the lost wax surrounding the main portion 310 and the core bumpers 320 of the core 301 such that the first and second surfaces 111 and 112 are formed and such that the core bumpers 320 form kiss-outs in the first and second surfaces 111 and 112 that can lead to the eventual creation of the pilot holes 2020 (see FIG. 6). Upon solidification of the metal, the shell 601 is removed in operation 203. The core 301 is removed from the cast component 101 in operation 204 using either an acidic or caustic leaching agent depending on the core material. Once the core leaching is completed, operation 205 includes locating the kiss-outs and subsequently forming the pilot holes 2020. This may include resizing at least one of the pilot holes 2020 with the help of a vision system to form resized pilot holes 2021 (see FIG. 6) that are receptive of the sealing plug 102. In some instances wherein the kiss-outs are not apparent, a light sanding of the surface of the cast component may be used to reveal the kiss-outs. In operation 206, the sealing plug 102 is non-removably or permanently installed into the at least one pilot hole 2020. An additional operation 207 of finishing outer surfaces of the cast component 101 to make the distal edges of the sealing plug 102 flush with the outer surfaces of the cast component 101 can also be executed.

Figure 5:
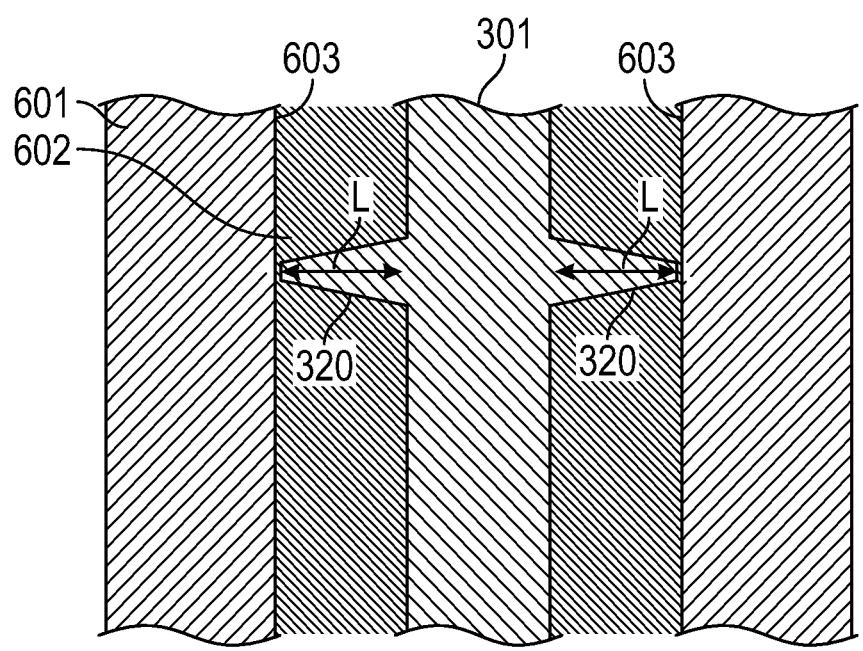
FIG. 5 is a side view illustrating a casting operation in accordance with embodiments.

With reference back to FIG. 1 and with additional reference to FIG. 5, the operation 202 of casting the cast component 101 of FIG. 1 is illustrated. As shown in FIG. 5, the casting includes forming the ceramic shell 601 as noted above in which the core 301 is disposed therein and which is sized to define space 602 between the main portion 310 of the core 301 and interior shell surfaces 603 that may be slightly larger than the entire lengths, L, of the core bumpers 320 (typically, a very small nominal gap between the core bumpers 320 and the interior shell surfaces 603 is provided).

With the core 301 thus disposed in the shell 601 and with the core bumpers 320 thus extending from the main portion 310 to almost reach the interior shell surfaces 603, molten material of the cast component 101 is poured into the space 602 and around the core bumpers 320.

Although the space 602 may be sufficiently wide to accommodate the entire length L of the core bumpers 320, the tips of the core bumpers 320 may cause small pilot holes 2020 (see FIG. 6) due to contact, or "kiss-out", with the interior shell surfaces 603 for a number reasons including tolerances, deflections, cast material shrinkage, etc. The molten material of the cast component 101 flows around the distal portions of the core bumpers 320 and may also form very thin film sections in the first and second surfaces 111 and 112. These very thin film sections may need to be removed by slight sanding to reveal the kiss-outs. Once the kiss-outs are located, the resized pilot holes 2021 can be formed.

With reference to FIG. 6 and, in accordance with embodiment, the step of locating the pilot holes 2020 and the subsequent resizing of at least one of the pilot holes 2020 to form the resized pilot holes 2021 of operation 205 are illustrated. Also illustrated is the non-removable or permanent installation of the sealing plug 102 into the at least one of the resized pilot holes 2021 of operation 206.

As shown in FIG. 6, the step of creating the resized pilot hole 2021 includes identifying the location of the pilot holes 2020 (i.e., residual holes, "kiss-outs", "print-outs" in FIG. 8) using a structured light vision system, such as a bluelight system such as a GOM 4105, to position the resized pilot hole 2021 installed by machining (using a CNC machine such as a GROB G352-1859), electro-discharge machine (EDM), or another suitable process. That is, the position of each pilot hole 2020 is identified by the structured light vision system, then the structured light vision system commands the machining device to said position and the resized pilot hole 2021 is placed such that the sealing plug 102 is in close enough tolerance with respect to internal features 120.

In accordance with further embodiments, the resizing can enlarge the at least one of the pilot holes 2020 so that the at least one of the resized pilot holes 2021 can receive the sealing plug 102. The non-removable or permanent installation of the sealing plug 102 into the at least one of the resized pilot holes 2021 can include sliding the sealing plug 102 into and through the at least one of the resized pilot holes 2021 and brazing the sealing plug 102 to the cast component 101. A braze material may also be used to create the sealing plug 102.

The braze material should be selected to be compatible with the alloy used in the cast component 101. The braze material must also have sufficient strength at the operating temperature of the cast component.

Figure 7:
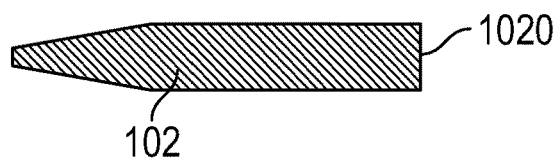
FIG. 7 is a side view of a plug to be used as an internal feature of a cast component in accordance with embodiments.

With continued reference to FIG. 6 and with additional reference to FIG. 7, the sealing plug 102 is extendible across the internal space 113 between first and second side parts 111 and 112 of the cast component 101. As shown in FIG. 6, this plug 1020 can be substantially rectangular in cross-section particularly in cases where opposed pilot holes 2020 are resized symmetrically. Alternatively, as shown in FIG. 7, where the pilot holes 2020 are initially frustoconical, the plug 1020 can be partially frustoconical in cross-section particularly in cases where only one of opposed pilot holes 2020 are resized.

Figure 8:
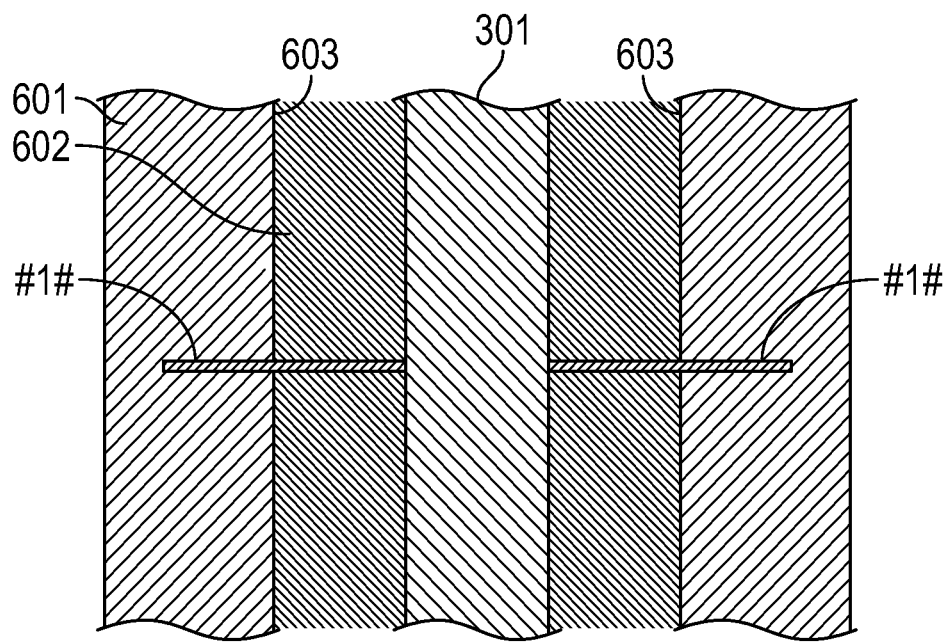
FIG. 8 is a side view illustrating a casting operation in accordance with alternative embodiments.

With reference to FIG. 8, an alternative method for positioning the core 301 using a core positioning feature such as a pin 901 to form the pilot hole 2020 is described. The pins 901 may be comprised of quartz, alumina, ceramic, etc., and the like. Once the wax is injected around the core 301 in operation 201A, the pins 901 are inserted into the soft wax pattern 602 to contact the core 301 while still protruding from the wax pattern 602. During the step of forming the shell 601 in operation 201B, the protruding portions of the pins 901 become trapped within the shell 601. After casting in operation 202 and removing the shell in operation 203, the pins 901 are removed concurrently with the core removal in operation 204. The location of each pin 901 leaves a print-out, or a residual hole that is similar to the kiss-out of a bumper, which functions as a pilot hole 2020.

Figure 9:
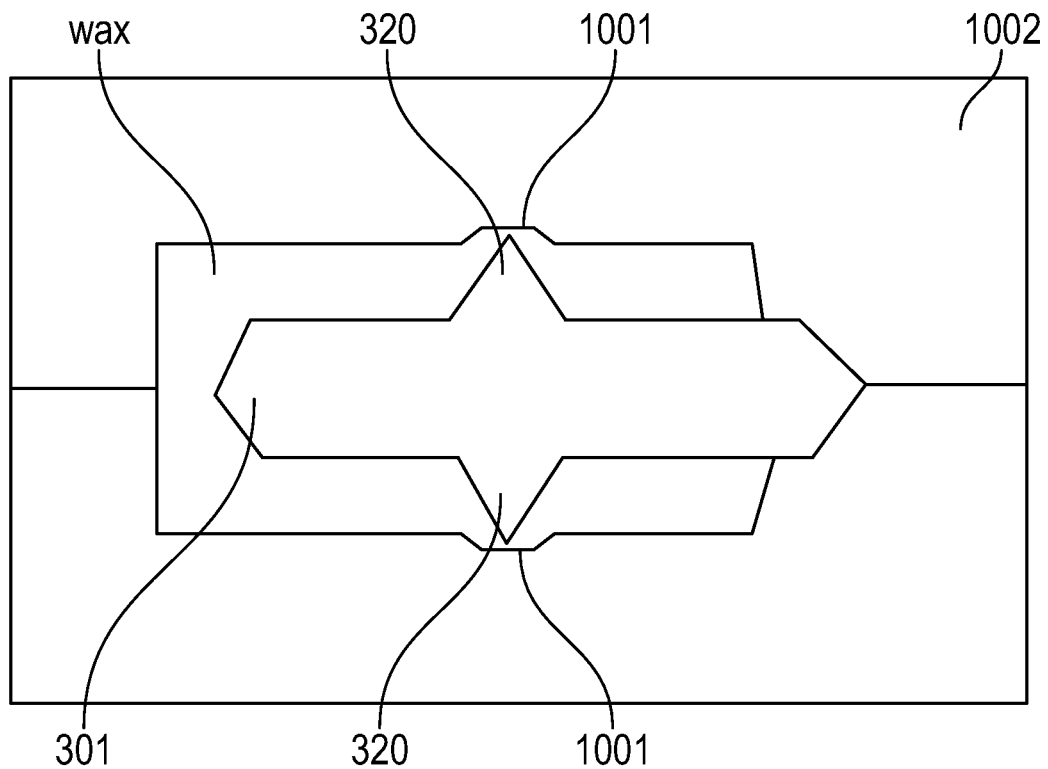
FIG. 9 is a side view illustrating pockets added to a wax die to create positive material in a casting in accordance with embodiments.

With reference to FIG. 9, an aspect of the description provided above is that "kiss-outs" of the core bumpers 320 can be seen in order for the pilot holes 2020 to be located and formed into resized pilot holes 2021. These "kiss-outs" are not necessarily always visible, however. In such cases, an additional operation of lightly blending or sanding an exterior of the cast component 101 can be executed to visually open the pilot holes 2020. For some cast components (such as turbine airfoil components) where the contour is critical or the narrow film may be considerably thicker, on the other hand, it may be undesirable to remove material from the exterior of the cast component 101. In these situations, small pockets 1001 can be added to the wax die 1002 to effectively create positive material in the cast component 101 for this removal without a net effect on the cast component's intended external shape.

With reference to FIG. 10, another preferred embodiment of the present invention includes a turbine airfoil component 1101 (such as a vane as shown or a blade) having a core 1102 wherein the core 1102 has core positioning features such as bumper 320A. During manufacture of the turbine airfoil component 1101, after casting of the metal and subsequent removal of the ceramic shell and leaching of the core 1102, the cast airfoil may reveal residual holes to locate the resultant resized pilot holes for eventual installation of the sealing plugs 102C. However, when the kiss-outs are not readily apparent and it is undesirable to remove material along, for example only, the trailing edge 1103, the small pockets of added wax to the die as shown in FIG. 9 is an advantage to providing sufficient material for creating the resized pilot hole for the installation of the sealing plug.

Technical effects and benefits of the features described herein are the provision of an investment casting process in which the use of core positioning features offers a high degree of wall thickness control that do not result in the formation of leakage holes or thin areas of the cast component. Such leakage holes or thin areas are detrimental to the performance of the cast component in such uses as aerospace components. The investment casting process is applicable to any investment cast part including, but not limited to, heat exchanger panels, combustors, turbine blades, vanes, and blade outer air seals (BOAS).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A cast component comprising:
a first surface element having a first side and a second side opposite the first side and forming an interior surface;
a second surface element having a first side and a second side opposite the first side and forming an interior surface;
an internal cavity formed from a core material between the second side forming the interior surface of the first surface element and the second side forming the interior surface of the second surface element;
ribs extending through the internal cavity to connect the second side forming the interior surface of the first surface element and the second side forming the interior surface of the second surface element, at least one of the ribs comprising an interruption; and
a sealing plug,
the core material having a core positioning feature extending from a surface of the core material at a location of the interruption of the at least one of the ribs,
wherein upon casting a pilot hole is formed at a location of the core positioning feature on a surface of the cast component, and
wherein:
the pilot hole is expanded to form a first resized pilot hole that extends through the first surface element from the second side to the first side with a uniform width and a second resized pilot hole that extends through the second surface element from the second side to the first side with a frustoconical shape whereby the resized pilot hole is configured for receiving the sealing plug inserted through the first surface element and into the second surface element,
the sealing plug comprises a leading end in an insertion direction that has a frustoconical shape corresponding to that of the second resized pilot hole of the second surface element, and
the sealing plug is configured to be received in the first and second resized pilot holes of the first and second surface elements, respectively, at the location of the core positioning feature and the interruption to complete the at least one of the ribs comprising the interruption.

2. The cast component according to claim 1, wherein the sealing plug is received and brazed in the resized pilot hole.

3. The cast component according to claim 1, wherein:
the cast component is a heat exchanger component,
the internal cavity defines open space between the first and second surface elements, which form portions of the heat exchanger component, and
the sealing plug extends across the internal cavity between the first and second surface elements forming the portions of the heat exchanger component.

4. The cast component according to claim 1, wherein:
the cast component is a turbine airfoil component,
the internal cavity defines open space between the first and second surface elements, which form portions of the turbine airfoil component, and
the sealing plug extends across the internal cavity between the first and second surface elements forming the portions of the turbine airfoil component.

5. The cast component according to claim 1, wherein the core material and the core positioning feature are ceramic.

6. A cast component comprising:
first and second surface elements disposed at a distance from one another to define a cavity;

ribs extending through the cavity to connect the first and second surface elements, at least one of the ribs comprising an interruption; and a sealing plug, wherein:

the first and second surface elements define first and second holes at the interruption, respectively, the first hole has a uniform width and the second hole has a frustoconical shape, the sealing plug is inserted through the first hole of the first surface element, across the cavity and into the second hole of the second surface element at the interruption to complete the at least one of the ribs, and the sealing plug comprises a leading end in an insertion direction that has a frustoconical shape corresponding to the frustoconical shape of the second hole.

7. The cast component according to claim 6, wherein:

the cast component is a heat exchanger component, the cavity defines open space between the first and second surface elements, which form portions of the heat exchanger component, and the sealing plug extends across the cavity between the first and second surface elements forming the portions of the heat exchanger component to complete the at least one of the ribs.

8. The cast component according to claim 6, wherein:

the cast component is a turbine airfoil component, the cavity defines open space between the first and second surface elements, which form portions of the turbine airfoil component, and the sealing plug extends across the cavity between the first and second surface elements forming the portions of the turbine airfoil component to complete the at least one of the ribs.

* * * * *